United States Patent Office 2,835,562
Patented May 20, 1958

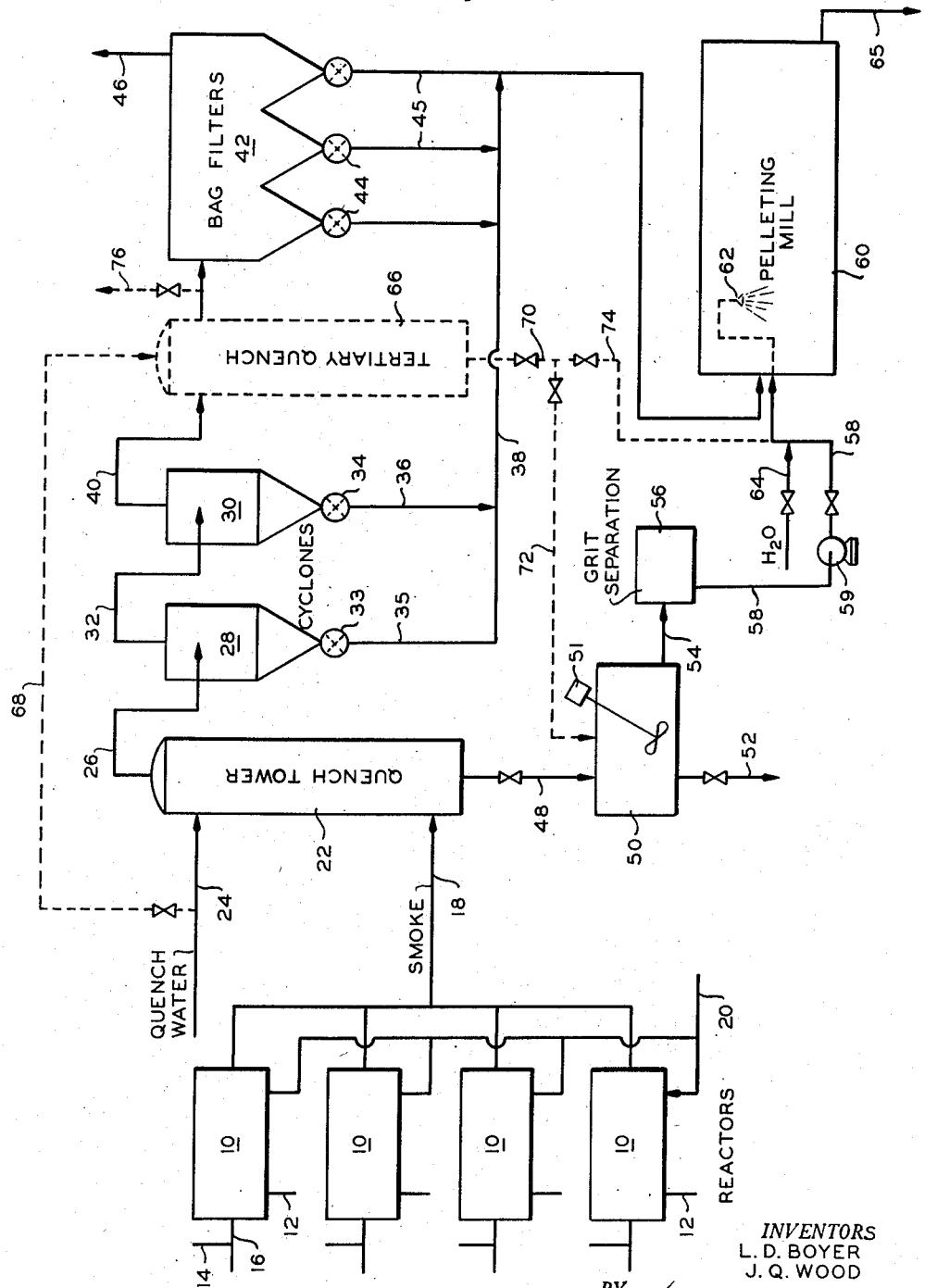

2,835,562

CARBON BLACK RECOVERY

Lyndon D. Boyer, Norman, and James Q. Wood, Bartlesville, Okla., assignors to Phillips Petroleum Company, a corporation of Delaware Application April 30, 1956, Serial No. 581,791

14 Claims. (Cl. 23—314)

This invention relates to a process and apparatus for recovering and pelleting carbon black.

Carbon black is conventionally produced in carbon black reactors or furnaces by partial combustion of a hydrocarbon feed such as oil to produce roughly three to four pounds of carbon black per gallon of oil feed. The hot smoke egressing from the downstream end of the furnace is water-quenched to reduce the temperature thereof so that it can be carried in ordinary carbon steel conduits. The smoke is then passed through a secondary quench tower in which the temperature is again substantially reduced usually to a temperature below about 500 to 600° F. The effluent smoke from the secondary quench tower is passed through carbon black recovery equipment such as cyclone separators and bag filters from which the still hot, dry black is recovered and passed to pelleting drums for formation into small pellets.

In the secondary quench tower not all of the water utilized in the quench is vaporized so that a substantial stream containing carbon black in the form of a slurry is recovered from the quench tower. It has been common practice in the carbon black industry to pass this slurry of carbon black back into the system through sprays to one of the quench zones, such as the primary or secondary quench. One of the principal difficulties in this type of operation is the plugging of the spray nozzles or orifices therein due to the high temperature of the sprayed ambient which renders it impractical to utilize the carbon black slurry from the quench tower as a recycle stream to the quench zone. However, it adds considerable economy to the carbon black producing process to reintroduce the carbon black in the quench slurry into the system so that it is incorporated in the final product. We have devised a process and arrangement of apparatus which utilizes the slurry of carbon black produced in the water quench tower while avoiding the usual difficulties involved in reintroducing this stream to the system.

It is an object of the invention to provide an improved process and an arrangement of apparatus for recovering and pelleting carbon black. Another object is to provide a process and an arrangement of apparatus which utilizes the aqueous carbon black slurry from a quench zone in a carbon black producing plant in the carbon black pelleting process of the plant. A further object is to provide more efficient carbon black recovery and pelleting. Other objects of the invention will become apparent from a consideration of the accompanying disclosure.

The invention comprises passing the carbon black slurry recovered from a quench zone in a carbon black producing plant through a grit separator and then introducing the grit-free slurry into a pelleting mill in which the dry black from the plant is being pelleted in a semi-wet or wet pelleting process. In this manner substantially all of the black knocked down in the quenching of the smoke from the carbon black reactors is recovered and incorporated in the pellets into which the product is formed without the difficulties involved and attendant upon returning the carbon black slurry to one of the quench zones.

In order to provide a more complete understanding of the invention, reference is made to the accompanying schematic drawing which is a plan view showing a preferred arrangement of apparatus for effecting the process of the invention and a flow of the process. A series of reactors 10 having the usual air inlet lines 12 and 14 and oil inlet line 16 deliver effluent smoke into a common smoke line 18. The effluent smoke is given a primary water-quench from quench line 20 as it leaves the reactors. Effluent smoke from line 18 is passed into a lower section of secondary quench tower 22 and water is introduced to an upper section thereof through quench line 24. Effluent smoke from quench tower 22 is passed via line 26 through a pair of cyclone separators 28 and 30 connected in series by smoke line 32. The major portion of the black is recovered from the smoke in separators 28 and 30 and is passed under the control of star valves 33 and 34 and lines 35 and 36, respectively, to black collecting line 38. The effluent smoke from the last separator is passed via line 40 to bag filters 42 from which the recovered black gravitates through star valves 44 and lines 45 into collecting line 38. Effluent gas is passed via line 46 to the atmosphere or to other disposal. Line 38 passes hot black to pelleting mill 60 described below.

An aqueous slurry of black is recovered from quench tower 22 via line 48 and is passed to a tank 50 provided with a stirrer or agitator 51. Stirrer 51 is positioned so as to effect and maintain the suspension of carbon black particles in the quench water to provide a suitable slurry for pumping through the lines downstream of tank 50. The heavier grit particles in the slurry in tank 50 settle to the bottom thereof and may be drawn off at suitable intervals through line 52. Slurry is passed via line 54 to grit separator 56 for removal of the grit suspended in the slurry. This separator may comprise a filter, a screen, or centrifugal separator, such as a cyclone. A screen filter of a mesh size in the range of 70 to 90 has been found satisfactory. The substantially grit-free slurry is pumped through line 58 by means of pump 59 to pelleting mill 60 where it is delivered to the bed of carbon black therein by means of one or more sprays 62. In pellet mill operation where the amount of water in the slurry in line 58 is insufficient to supply the required water, additional water is added through line 64.

Pelleting mill 60 may be any suitable type of mill effective in semi-wet or wet pelleting of carbon black. The preferred type is a horizontally elongated rotatable cylindrical mill into which the black is fed adjacent one end and the pellets are recovered over a weir from the opposite end. The application of Oliver K. Austin, Serial No. 386,585, filed October 16, 1953, discloses a semi-wet pelleting process for carbon black which utilizes water sprayed at a rate up to 24 pounds per 100 pounds of black fed to the mill. Due to the hot condition of the black which enters the mill at a temperature in the range of 150 to 300° F. and the additional heat developed by friction in the mill, most of the water added to the pellet bed is evaporated and passes out of the hood of the mill so that the product pellets contain a maximum of one weight percent of moisture. Greater amounts of water may be utilized in the pelleting process up to about 122 pounds of water per 100 pounds of black without forming a carbon black mud in the mill. Operation in this manner is termed wet pelleting but actually the carbon black in the mill has a dry appearance during the pelleting unless the amount of moisture exceeds about 122 pounds per 100 pounds of black. In processes using larger amounts of water hot, dry gas, such as flue gas or air may be introduced to the mill to effect additional vaporization so that the effluent pellets contain not more than about one weight percent of moisture. Product pellets are recovered from mill 60 via line 65. In actual operation a portion of the pellets are recycled from line 65 to the feed end of the mill by conventional conveyor means not shown.

In another embodiment of the invention a tertiary quench or water treatment is given the smoke in line 40 in a device 66 which may comprise a quench tower, a wet cyclone separator, or a slot scrubber. Water is introduced to device 66 via line 68 which connects with quench line 24 or other suitable source of water. An aqueous slurry of carbon black is produced in device 66 which is recovered in line 70 and is passed either via line 72 to tank 50 or via line 74 to line 58 for delivery through sprays 62 into pellet mill 60. In some applications device 66 is effective in recovering substantially all of the black entrained in the smoke in line 40 so that the effluent gas therefrom may be vented via line 76 thereby eliminating bag filter separation means 42.

It is found to be essential to remove the grit from the carbon black slurry recovered from the secondary quench tower in order to introduce the slurry to the pelleting mill without deleteriously affecting the quality of the pelleted product. It is also found that in order to pump the slurry through the lines between the quench tower and the pelleting mill the carbon black content must not exceed about three weight percent of the slurry. The carbon black content is maintained in the range of about one-half to two weight percent of the slurry by addition of water to or withdrawal of water from the slurry in tank 50 by any suitable means (not shown).

Operation in accordance with and in illustration of the invention comprises quenching the reactor effluent to a temperature of 550 to 600° F. and the cooled smoke at the rate of 2,420,000 lbs./day "dry" off-gas, containing 698,000 lbs. H₂O/day and 245,000 lbs. carbon black/day, is passed into the secondary quench tower. Water to the extent of 62,000 lbs./day is sprayed into the ascending gas in the tower so as to cool same to about 450 to 475° F. and the smoke is passed to a battery of dry cyclones at this temperature to recover most of the black therefrom. The gas stream from the cyclones is passed at a temperature of about 450° F. to a tertiary quench zone where it is contacted with 280,000 to 300,000 lbs./day of H₂O to knock the temperature of the gas stream down to about 250° F. at which temperature it is passed to a battery of bag filters which recover residual black, and the denuded gas is vented to the atmosphere. Black from the cyclones and bag filters is passed to a series of horizontally rotating cylindrical pellet mills 8' in diameter and 48' in length at the rate of 40,000 lbs./day/mill.

Slurries from both the secondary and tertiary quench zones at a combined rate of about 6 G. P. M. at a black concentration of about 2 wt. percent in suspension are recovered and slurry is passed to the pelleting mills at the rate of 16 G. P. H./mill (8% H₂O related to loose black feed). The slurry from the secondary quench is screened thru 0.005" screens. The black concentration may vary from 0.5 to 3.5 wt. percent of the slurry fed to the mills. About 75% of the slurry in the above described process comes from the tertiary quench. Recycle pellets range from 40,000 to 160,000 lbs./day and product pellets contain less than 1 wt. percent moisture. One significant advantage can be obtained by operating the secondary quench so that only a very small proportion of the quench water introduced thereto remains in liquid form, and operating the tertiary quench to effect the final lowering of temperature before passing the effluent gas to the bag filters for final recovery of black. In this manner the grit in the smoke stream entering the secondary quench is removed therefrom and the slurry therefrom which carries the grit can be disposed of without significant loss of black; and the much larger slurry from the tertiary quench is substantially grit-free so that it can be passed to the pelleting mill without the grit-removal step.

Certain modifications of the invention will become apparent to those skilled in the art and the illustrative details disclosed are not to be construed as imposing unnecessary limitations on the invention.

We claim:

1. A process for recovering and pelleting carbon black present in the effluent smoke from a carbon black reactor which comprises water-quenching said effluent in a quenching zone, whereby an aqueous slurry carrying grit and a portion of carbon black in said smoke flows from a lower section of said quench zone and a gaseous stream carrying most of the carbon black flows from the upper section thereof; recovering carbon black from said gaseous stream and passing same to a pelleting zone; separating grit from said slurry; and then passing said slurry to said pelleting zone to pellet the black therein with the black recovered from said gaseous stream.

2. The process of claim 1 wherein said pelleting process is a wet pelleting process utilizing water in the range of about 25 to 122 pounds per 100 pounds of black.

3. The process of claim 1 wherein said pelleting process is a semi-wet pelleting process utilizing up to 24 pounds of water per 100 pounds of black.

4. A process for recovering and pelleting carbon black present in the effluent smoke from a series of carbon black reactors in which said smoke is given a primary water quench as it leaves each reactor, which comprises quenching said smoke in a secondary quench zone with a stream of water, whereby an aqueous slurry carrying a minor portion of the black in said smoke flows from a lower section of said zone and the quenched smoke flows from an upper section thereof; recovering the black from said quenched smoke and passing same to a pelleting zone; separating grid from said slurry; and then passing said slurry to said pelleting zone to pellet the black therein with the black recovered from said gaseous stream.

5. The process of claim 4 including the steps of passing the gas, remaining after most of the black has been removed, in contact with water to recover residual black so as to produce a second aqueous slurry of black; and passing said second slurry to said pelleting zone.

6. The process of claim 4 including the steps of passing the effluent smoke from said secondary quench zone thru at least one cyclone separation zone to remove a substantial portion of the black therein; then passing the effluent smoke thru at least one bag filter to recover additional black; and combining the black from said cyclone and said filter in said pelleting zone.

7. The process of claim 6 including the steps of water-quenching the smoke stream between said cyclone and said bag filter to form a second slurry of black and passing the resulting slurry to said pelleting zone.

8. The process of claim 6 including the steps of passing the smoke stream intermediate said cyclone and said bag filter thru a wet cyclone whereby a second aqueous slurry of black is recovered and passing the resulting slurry to said pelleting zone.

9. Apparatus comprising in combination a carbon black reactor having a smoke effluent line and means for spraying water into the effluent end section of said reactor; a secondary quench tower in said effluent line having smoke outlet means in an upper section and slurry outlet means in a lower section; means for spraying water into said tower; at least one dry cyclone separator connected to the smoke outlet of said tower having smoke outlet means in an upper section and solids outlet means in a lower section; a pelleting mill having spray means therein; a line connecting said solids outlet means with said pelleting mill; a line leading from said slurry outlet means to said spray means; and grit separation means in last said line.

10. The apparatus of claim 9 including a tank in the line connecting said solids outlet means with said pelleting mill and an agitator in said tank for effecting suspension of carbon black in water recovered from said quench tower.

11. The apparatus of claim 9 including bag filter means connected by a line to the smoke outlet of said cyclone separator; having solids outlet means in a lower section thereof; and a line connecting last said solid outlet means with said pelleting mill.

12. The apparatus of claim 9 including a wet cyclone separator connected with the smoke outlet of said dry cyclone separator; means for introducing water to said wet cyclone separator; and line leading from a lower section of said wet cyclone separator to said spray means.

13. The apparatus of claim 9 including a tertiary quench tower connected with the smoke outlet of said dry cyclone separator; means for introducing water to an upper section of said tertiary quench tower; and a line leading from a lower section of said tertiary quench tower to said spray means.

14. The apparatus of claim 13 including bag filter means connected to an upper section of said tertiary quench tower and a line connecting an outlet in a lower section of said bag filter means with said pelleting mill.

References Cited in the file of this patent

UNITED STATES PATENTS

| | | |
|---|---|---|
| Re. 22,454 | Wiegand et al. | Mar. 7, 1944 |
| 2,668,754 | Lichtenfels | Feb. 9, 1954 |
| 2,677,439 | Hedberg | May 4, 1954 |

FOREIGN PATENTS

| | | |
|---|---|---|
| 688,776 | Great Britain | Mar. 11, 1953 |

OTHER REFERENCES

"Chemical Engineering," pages 203, 205, September 1950.

Stokes et al.: "Chemical Industries," 64, 40–43 and 104, January 1949.